(12) United States Patent
Walton et al.

(10) Patent No.: US 11,120,919 B2
(45) Date of Patent: Sep. 14, 2021

(54) SMALL MODULAR REACTOR FUEL ASSEMBLY

(71) Applicant: BWXT mPower, Inc., Charlotte, NC (US)

(72) Inventors: Lewis A. Walton, Forest, VA (US); George S. Pabis, Lynchburg, VA (US); Julius M. Ullmann, Forest, VA (US); Jean H. Raas, Lynchburg, VA (US); Martha A. Gilliam, Lynchburg, VA (US); Anne R. Austin, Forest, VA (US); Eric A. Barringer, Rustburg, VA (US)

(73) Assignee: BWXT mPower, Inc., Charlotte, NC (US)

( * ) Notice: Subject to any disclaimer, the term of this patent is extended or adjusted under 35 U.S.C. 154(b) by 341 days.

(21) Appl. No.: 15/974,888

(22) Filed: May 9, 2018

(65) Prior Publication Data

US 2018/0261341 A1    Sep. 13, 2018

Related U.S. Application Data

(62) Division of application No. 13/864,315, filed on Apr. 17, 2013, now Pat. No. 9,972,407.

(Continued)

(51) Int. Cl.
*G21C 1/32* (2006.01)
*G21C 3/33* (2006.01)
(Continued)

(52) U.S. Cl.
CPC ............ *G21C 3/3315* (2013.01); *G21C 1/32* (2013.01); *G21C 7/08* (2013.01); *G21C 13/02* (2013.01);
(Continued)

(58) Field of Classification Search
CPC ......... G21C 3/33; G21C 3/331; G21C 3/3315
See application file for complete search history.

(56) References Cited

U.S. PATENT DOCUMENTS

| 3,379,617 | A | 4/1968 | Andrews et al. |
| 3,814,667 | A | 6/1974 | Klumb et al. |
| (Continued) | | | |

FOREIGN PATENT DOCUMENTS

| CN | 1233842 A | 11/1999 |
| CN | 201247601 Y | 5/2009 |

OTHER PUBLICATIONS

Extended European Search Report dated Oct. 30, 2015 for European Patent Application No. 13778166.2.

(Continued)

*Primary Examiner* — Sharon M Davis
(74) *Attorney, Agent, or Firm* — Nelson Mullins Riley & Scarborough LLP (57) ABSTRACT

A pressurized water reactor (PWR) comprises a pressure vessel containing primary coolant water. A nuclear reactor core is disposed in the pressure vessel and includes a plurality of fuel assemblies. Each fuel assembly includes a plurality of fuel rods containing a fissile material. A control system includes a plurality of control rod assemblies (CRA's). Each CRA is guided by a corresponding CRA guide structure. A support element is disposed above the CRA guide structures and supports the CRA guide structures. The pressure vessel may be cylindrical, and the support element may comprise a support plate having a circular periphery supported by the cylindrical pressure vessel. The CRA guide structures suitably hang downward from the support plate. The lower end of each CRA guide (Continued)

structure may include alignment features that engage corresponding alignment features of the upper end of the corresponding fuel assembly.

4 Claims, 7 Drawing Sheets

Related U.S. Application Data (60) Provisional application No. 61/625,448, filed on Apr. 17, 2012.

(51) Int. Cl.
    *G21C 7/08*     (2006.01)
    *G21C 13/02*     (2006.01)
    *G21C 13/024*     (2006.01)

(52) U.S. Cl.
    CPC ............. *G21C 13/024* (2013.01); *G21C 3/33* (2013.01); *Y02E 30/30* (2013.01)

(56) References Cited

U.S. PATENT DOCUMENTS

| | | | |
|---|---|---|---|
| 3,853,703 A * | 12/1974 | Anthony | G21C 3/32 376/364 |
| 3,940,311 A | 2/1976 | Frisch et al. | |
| 4,078,966 A | 3/1978 | Verdeau | |
| 4,381,284 A * | 4/1983 | Gjertsen | G21C 3/3305 376/364 |
| 4,793,965 A | 12/1988 | Altman et al. | |
| 4,857,264 A | 8/1989 | Veronesi et al. | |
| 4,863,678 A | 9/1989 | Shockling et al. | |
| 4,876,061 A | 10/1989 | Ekeroth et al. | |
| 4,882,123 A | 11/1989 | Cearley et al. | |
| 4,885,127 A | 12/1989 | Yokoyama | |
| 4,888,151 A | 12/1989 | Gjertsen et al. | |
| 4,895,698 A | 1/1990 | DeMario | |
| 4,923,669 A | 5/1990 | DeMario | |
| 4,957,697 A | 9/1990 | Wada | |
| 4,966,745 A | 10/1990 | Widener et al. | |
| 4,990,304 A | 2/1991 | Rylatt | |
| 4,993,864 A | 2/1991 | Gjertsen et al. | |
| 4,994,233 A | 2/1991 | Freeman | |
| 4,996,018 A | 2/1991 | Bhatt et al. | |
| 5,009,837 A | 4/1991 | Nguyen et al. | |
| 5,024,806 A | 6/1991 | Cioffi et al. | |
| 5,030,413 A | 7/1991 | Knierriem et al. | |
| 5,043,134 A | 8/1991 | Widener et al. | |
| 5,064,607 A | 11/1991 | Miller et al. | |
| 5,068,083 A | 11/1991 | John, Jr. et al. | |
| 5,141,711 A | 8/1992 | Gjertsen et al. | |
| 5,158,740 A | 10/1992 | Boatwright | |
| 5,200,138 A | 4/1993 | Ferrari | |
| 5,207,980 A | 5/1993 | Gilmore et al. | |
| 5,227,125 A | 7/1993 | Beneck et al. | |
| 5,265,137 A | 11/1993 | Busch | |
| 5,268,948 A | 12/1993 | Church et al. | |
| 5,274,685 A * | 12/1993 | Yates | G21C 3/12 376/364 |
| 5,282,231 A | 1/1994 | Adams et al. | |
| 5,282,233 A | 1/1994 | Bryan | |
| 5,299,246 A | 3/1994 | Bryan | |
| 5,361,279 A | 11/1994 | Kobsa et al. | |
| 5,367,549 A | 11/1994 | Hatfield | |
| 5,436,945 A | 7/1995 | Weisel et al. | |
| 5,513,234 A | 4/1996 | Rottenberg | |
| 5,606,582 A | 2/1997 | Bergamaschi | |
| 5,625,657 A | 4/1997 | Gallacher | |
| 5,640,434 A | 6/1997 | Rottenberg | |
| 5,841,824 A | 11/1998 | Graham | |
| 6,055,288 A | 4/2000 | Schwirian | |
| 6,088,420 A | 7/2000 | Yokoyama et al. | |
| 6,091,790 A | 7/2000 | Ridolfo | |
| 6,130,927 A | 10/2000 | Kang et al. | |
| 6,236,699 B1 | 5/2001 | Ridolfo | |
| 6,275,557 B2 | 8/2001 | Nylund et al. | |
| 6,295,329 B1 | 9/2001 | Maehara et al. | |
| 6,421,405 B1 | 7/2002 | Ridolfo | |
| 6,636,578 B1 | 10/2003 | Clark | |
| 6,636,580 B2 | 10/2003 | Murakami et al. | |
| 6,810,099 B2 | 10/2004 | Nakamaru et al. | |
| 6,819,733 B2 | 11/2004 | Broders et al. | |
| 6,865,242 B2 | 3/2005 | Barbe et al. | |
| 6,895,067 B2 | 5/2005 | Borum et al. | |
| 7,085,340 B2 | 8/2006 | Goldenfield et al. | |
| 7,257,185 B1 | 8/2007 | Yamada et al. | |
| 7,280,946 B2 | 10/2007 | Russell, II et al. | |
| 7,412,021 B2 | 8/2008 | Fetterman et al. | |
| 7,424,412 B2 | 9/2008 | Kropaczek et al. | |
| 7,428,479 B2 | 9/2008 | Boer et al. | |
| 7,453,972 B2 | 11/2008 | Hellandbrand, Jr. et al. | |
| 7,526,058 B2 | 4/2009 | Fawcett et al. | |
| 7,548,602 B2 | 6/2009 | Smith, III et al. | |
| 7,561,654 B2 | 7/2009 | Makovicka et al. | |
| 7,574,337 B2 | 8/2009 | Kropaczek et al. | |
| 7,668,280 B2 | 2/2010 | Hellandbrand, Jr. et al. | |
| 7,668,284 B2 | 2/2010 | Sparrow et al. | |
| 9,972,407 B2 | 5/2018 | Walton et al. | |
| 2003/0123600 A1 | 7/2003 | Hesketh et al. | |
| 2003/0169839 A1 | 9/2003 | Matteson | |
| 2005/0069080 A1 | 3/2005 | Goldenfield et al. | |
| 2006/0153327 A1 | 7/2006 | Jiang | |
| 2006/0222140 A1 | 10/2006 | Aleshin et al. | |
| 2006/0251205 A1 | 11/2006 | Balog | |
| 2007/0133732 A1 | 6/2007 | Nakayama et al. | |
| 2007/0206717 A1 | 9/2007 | Conner et al. | |
| 2008/0084957 A1 | 4/2008 | Aleshin et al. | |
| 2008/0253496 A1 | 10/2008 | McCarty et al. | |
| 2009/0032178 A1 | 2/2009 | Feinroth | |
| 2009/0122946 A1 | 5/2009 | Fawcett et al. | |
| 2010/0316177 A1 | 12/2010 | Stambaugh et al. | |

OTHER PUBLICATIONS

International Search Report and Written Opinion for PCT/US2013/036888 dated Aug. 2, 2013.

Office Action dated Dec. 25, 2015 for Chinese Patent Application No. 201380020311.8.

Office Action dated Oct. 19, 2016 for EP Application No. 13778166.2.

* cited by examiner

SMALL MODULAR REACTOR FUEL ASSEMBLY

This application is a divisional of U.S. patent application Ser. No. 13/864,315 filed Apr. 17, 2013, now U.S. Pat. No. 9,972,407, which claims the benefit of U.S. Provisional Application No. 61/625,448 filed Apr. 17, 2012, the entire disclosures of which are incorporated by reference herein.

BACKGROUND

The following relates to the nuclear power reactor arts and related arts.

Figure 1:
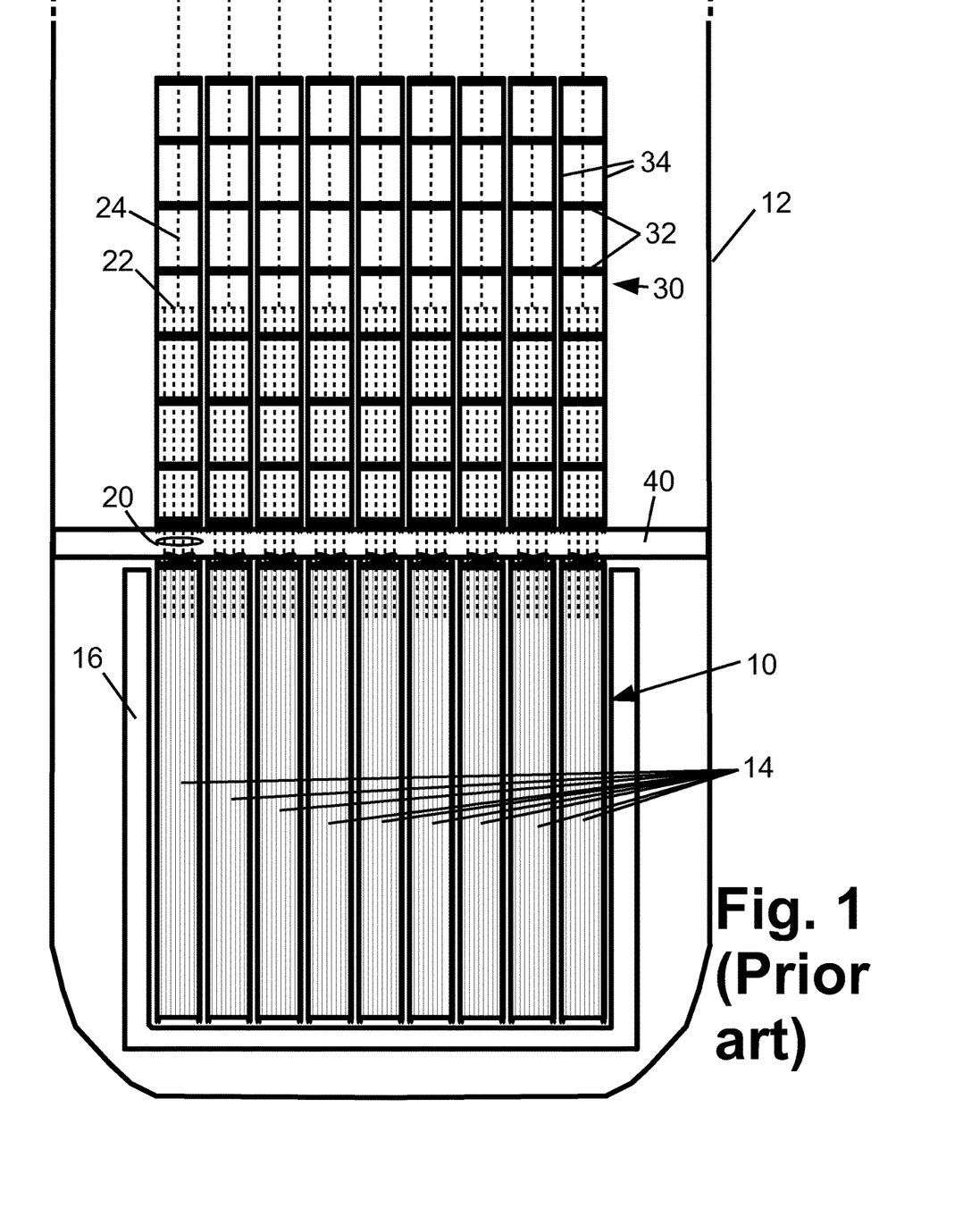
FIG. 1 diagrammatically shows a side sectional view of the lower portion of a pressurized water reactor (PWR) according to the prior art.
Figure 2:
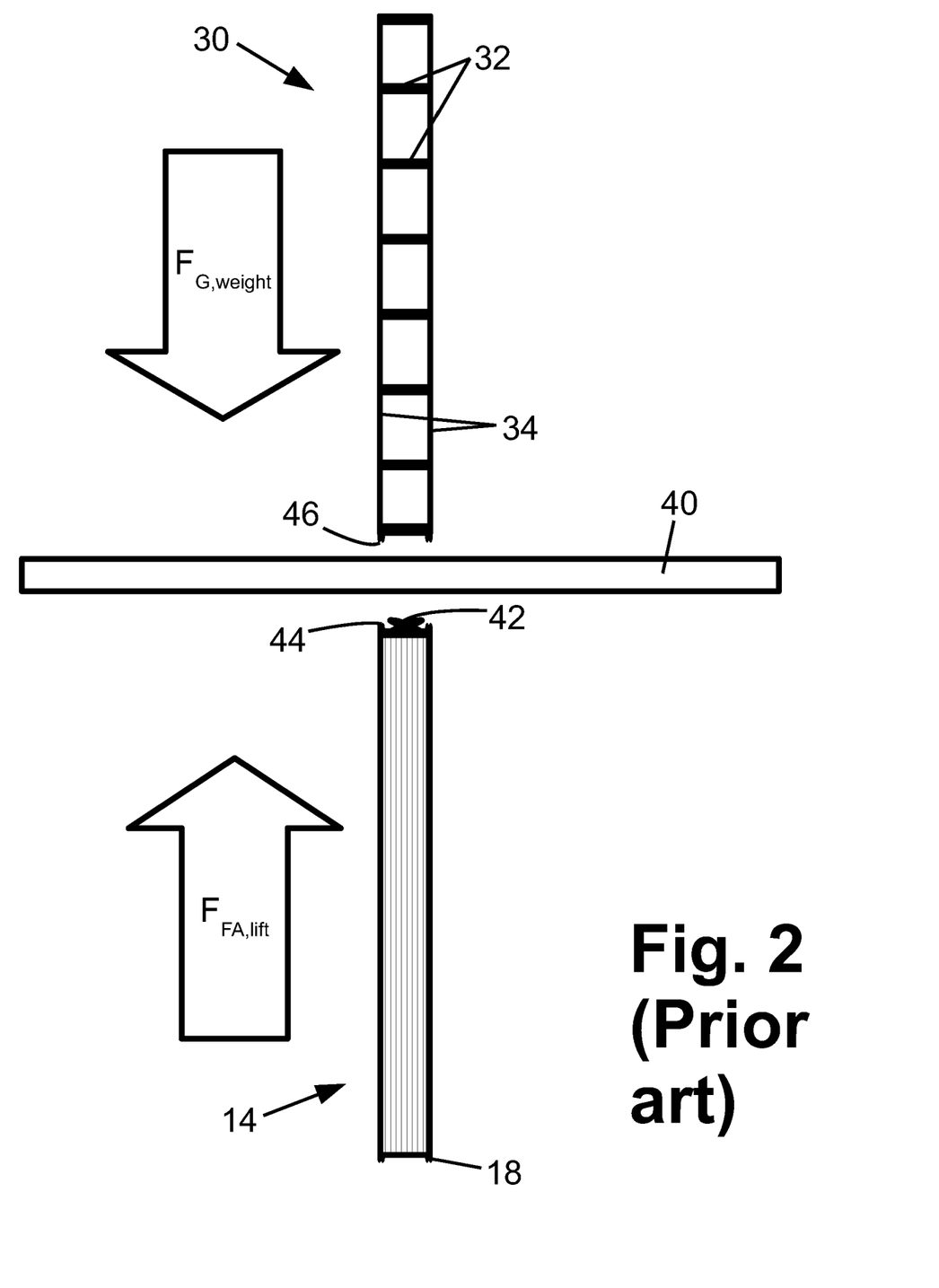
FIG. 2 diagrammatically shows an exploded view of a single fuel assembly and the corresponding control rod assembly (CRA) guide structure of the prior art PWR of FIG. 1.

With reference to FIGS. 1 and 2, the lower portion of a nuclear power plant of the pressurized water configuration, commonly called a pressurized water reactor (PWR) design, is shown. A nuclear reactor core 10 comprises an assembly of vertically oriented fuel rods containing fissile material, typically $^{235}$U. The reactor core 10 is disposed at or near the bottom of a pressure vessel 12 that contains primary coolant water serving as a moderator to moderate the chain reaction and as coolant to cool the reactor core 10. The primary coolant further acts as a heat transfer medium conveying heat generated in the reactor core 10 to a steam generator. At the steam generator, heat from the primary coolant transfers to a secondary coolant loop to convert the secondary coolant into steam that is used for a useful purpose, such as driving a turbine of an electrical power generation facility. A conventional PWR design includes one or (typically) more steam generators that are external to the pressure vessel containing the nuclear reactor core. Large-diameter piping carries primary coolant from the pressure vessel to the external steam generator and back from the steam generator to the pressure vessel to complete a primary coolant flow loop. In some designs the external steam generator is replaced by an internal steam generator located inside the pressure vessel, which has the advantage of eliminating the large diameter piping (replaced by secondary coolant feedwater and steam outlet lines that are typically of lower diameter and that do not carry the primary coolant that flows through the reactor core). Note that FIG. 1 is a diagrammatic view of the lower reactor core region and does not include features relating to the steam generator or ancillary components.

The vertical fuel rods of the reactor core 10 are organized into fuel assemblies 14. Illustrative FIG. 1 shows a side view of a 9×9 array of fuel assemblies 14, although arrays of other sizes and/or dimensions can be employed. In turn, each fuel assembly 14 comprises an array of vertically oriented fuel rods, such as a 18×18 array of fuel rods, or a 14×14 array, or so forth. The fuel assemblies further include a lower end fitting, upper end fitting, vertical guide tubes connecting the end fittings, and a number of spacer grids connected to the guide tubes, instrument tubes and fuel rods. The spacer grids fit around the guide tubes to precisely define the spacing between fuel rods and to add stiffness to the fuel assembly 14. The spacer grids may or may not be welded to the guide tubes. (Note, FIGS. 1 and 2 represent the fuel rods of each fuel assembly 14 are shown diagrammatically with vertical lines which are not to scale respective to size or quantity, and the spacer grids, guide tubes, and other features are not shown). It is noted that the dimensions of the array of fuel assemblies 14 may in general be different from the dimensions of the array of fuel rods within the fuel assembly 14. The fuel assemblies may employ rectangular fuel rod packing and have a square cross section, or may employ hexagonal fuel rod packing and have a hexagonal cross section, or so forth). The reactor core 10 comprising fuel assemblies 14 is disposed in a core basket 16 that is mounted inside the pressure vessel 12. The lower end fitting of each fuel assembly 14 includes features 18 that engage with a core plate. (The core plate, basket mounting, and other details are not shown in diagrammatic FIG. 1).

The reactor control system typically includes a control rod assembly (CRA) operated by a control rod drive mechanism (CRDM) (not shown in FIGS. 1 and 2). The CRA includes vertically oriented control rods 20 containing neutron poison. A given control rod is controllably inserted into one fuel assembly 14 through a designated vertical guide tube of the fuel assembly 14. Typically, all the control rods for a given fuel assembly 14 are connected at their top ends to a common termination structure 22, sometimes called a spider, and a connecting rod 24 connects at its lower end with the spider 22 and at its upper portion with the CRDM (upper end not shown). The CRA for a single fuel assembly 14 thus comprises the control rods 20, the spider 22, and the connecting rod 24, and this CRA moves as a single translating unit. In the PWR design, the CRA is located above the reactor core 10 and moves upward in order to withdraw the control rods 20 from the fuel assembly 14 (and thereby increase reactivity) or downward in order to insert the control rods 20 into the fuel assembly 14 (and thereby decrease reactivity). The CRDM is typically designed to release the control rods so as to fall into the reactor core 10 and quickly quench the chain reaction in the event of a power failure or other abnormal event.

Because the reactor control system is a safety-related feature, applicable nuclear safety regulations (for example, promulgated by the Nuclear Regulatory Commission, NRC, in the United States) pertain to its reliability, and typically dictate that the translation of the CRA be reliable and not prone to jamming. The translation of the CRA should be guided to ensure the control rods move vertically without undue bowing or lateral motion. Toward this end, each CRA is supported by a control rod guide structure 30 which comprises horizontal guide plates 32 mounted in a spaced-apart fashion on vertical frame elements 34. Each guide plate 32 includes openings or passages or other camming surfaces (not visible in the side view of diagrammatic FIGS. 1 and 2) that constrain the CRA so that the rods 20, 24 are limited to vertical movement without bowing or lateral movement.

With continuing reference to FIGS. 1 and 2, the CRA guide assemblies 30 have substantial weight indicated by downward arrow $F_{G,weight}$ in FIG. 2, and are supported by a weight-bearing upper core plate 40. The fuel assemblies 14 are also relatively heavy. However, in a conventional PWR the primary coolant circulation rises through the fuel assemblies 14, producing a net lifting force on the fuel assemblies 14 indicated by upward arrow $F_{FA,lift}$. Accordingly, the fuel assemblies 14 while typically resting on the bottom of the core basket 16, are susceptible to being lifted upward by the lift force $F_{FA,lift}$ and press against the upper core plate 40. The lift force $F_{FA,lift}$ is thus also borne by the upper core plate 40. The upper core plate 40 thus is a spacer element disposed between and spacing apart the lower end of the CRA guide assembly 30 and the upper end of the corresponding fuel assembly 14. To avoid damaging the fuel rods, each fuel assembly 14 typically includes a hold-down spring subassembly 42 that preloads the fuel assembly 14 against the upper core plate 40 and prevents lift-off of the fuel assembly 14 during normal operation. The hold-down spring 42 is thus also disposed between the lower end of the CRA guide assembly 30 and the upper end of the corresponding fuel assembly 14. Additionally, alignment features 44, 46 are provided on the upper end of the fuel assembly 14 and the lower end of the CRA guide structure 30, respectively, to assist alignment.

A PWR such as that of FIGS. 1 and 2 is typically designed to provide electrical power of around 500-1600 megawatts. The fuel assemblies 14 for these reactors are typically between 12 and 14 feet long (i.e., vertical height) and vary in array size from 14×14 fuel rods per fuel assembly to 18×18 fuel rods per fuel assembly. The fuel assemblies for such PWR systems are typically designed to operate between 12- and 24-month cycles before being shuffled in the reactor core. The fuel assemblies are typically operated for three cycles before being moved to a spent fuel pool. The fuel rods typically comprise uranium dioxide ($UO_2$) pellets or mixed $UO_2$/gadolinium oxide ($UO_2$-$Gd_2O_3$) pellets, of enrichment chosen based on the desired core power.

BRIEF SUMMARY

In one aspect of the disclosure, a pressurized water reactor (PWR) comprises: a pressure vessel containing primary coolant water; a nuclear reactor core disposed in the pressure vessel and including a plurality of fuel assemblies wherein each fuel assembly includes a plurality of fuel rods containing a fissile material; a control system including a plurality of control rod assemblies wherein each control rod assembly is guided by a corresponding control rod assembly guide structure; and a support element disposed above the control rod assembly guide structures wherein the support element supports the control rod assembly guide structures. In some embodiments the pressure vessel is a cylindrical pressure vessel and the support element comprises a support plate having a circular periphery supported by the cylindrical pressure vessel. In some embodiments the control rod assembly guide structures hang downward from the support plate. In some embodiments the lower end of each control rod assembly guide structure includes alignment features that engage corresponding alignment features of the upper end of the corresponding fuel assembly.

In another aspect of the disclosure, a method comprises: operating a pressurized water reactor (PWR) wherein the operating includes circulating primary coolant in a pressure vessel upward through a nuclear reactor core that includes a plurality of fuel assemblies wherein each fuel assembly includes a plurality of fuel rods containing a fissile material; and during the operating, suspending control rod drive assembly guide structures disposed in the pressure vessel from suspension anchors disposed above the control rod drive assembly guide structures. In some such method embodiments, a downward force (other than gravity) is not applied against the fuel assemblies during the operating. In some such method embodiments, upward strain of the fuel assemblies and downward strain of the suspended control rod drive assembly guide structures is accommodated during the operating by a gap between the tops of the fuel assemblies and the bottoms of the suspended control rod drive assembly guide structures.

In another aspect of the disclosure, a pressurized water reactor (PWR) comprises: a pressure vessel containing primary coolant water; a nuclear reactor core disposed in the pressure vessel and including a plurality of fuel assemblies wherein each fuel assembly includes a plurality of fuel rods containing a fissile material; a control system including a plurality of control rod assemblies wherein each control rod assembly includes control rods selectively inserted into the nuclear reactor core and wherein each control rod assembly is guided by a corresponding control rod assembly guide structure; wherein there is a gap between the bottoms of the control rod assembly guide structures and the top of the nuclear reactor core and wherein no spacer element or spring is disposed in the gap. In some embodiments the control rod assembly guide structures are not supported from below the control rod assembly guide structures. In some embodiments there is a one-to-one correspondence between the control rod assembly guide structures and the fuel assemblies of the nuclear reactor core, and the lower end of each control rod assembly guide structure includes alignment features that engage corresponding alignment features of the upper end of the corresponding fuel assembly. In some embodiments the PWR further includes a support element disposed above the control rod assembly guide structures and anchoring the tops of the control rod assembly guide structures such that the control rod assembly guide structures are suspended from the support element. In some embodiments flow of primary coolant water in the pressure vessel in the operational state of the PWR is not sufficient to lift the fuel assemblies upward.

In another aspect of the disclosure, a nuclear reactor fuel assembly is configured for installation and use in a pressurized water nuclear reactor (PWR). The nuclear reactor fuel assembly includes a bundle of fuel rods containing a fissile material, and alignment features disposed at an upper end of the nuclear reactor fuel assembly. The upper end of the nuclear reactor fuel assembly is not configured as a load bearing structure. In some embodiments the upper end of the nuclear reactor fuel assembly does not include any hold-down springs. In some embodiments the alignment features disposed at the upper end of the nuclear reactor fuel assembly are configured to mate with corresponding alignment features of a control rod assembly guide structure.

BRIEF DESCRIPTION OF THE DRAWINGS

The invention may take form in various components and arrangements of components, and in various process operations and arrangements of process operations. The drawings are only for purposes of illustrating preferred embodiments and are not to be construed as limiting the invention.

DETAILED DESCRIPTION OF THE PREFERRED EMBODIMENTS

Figure 3:
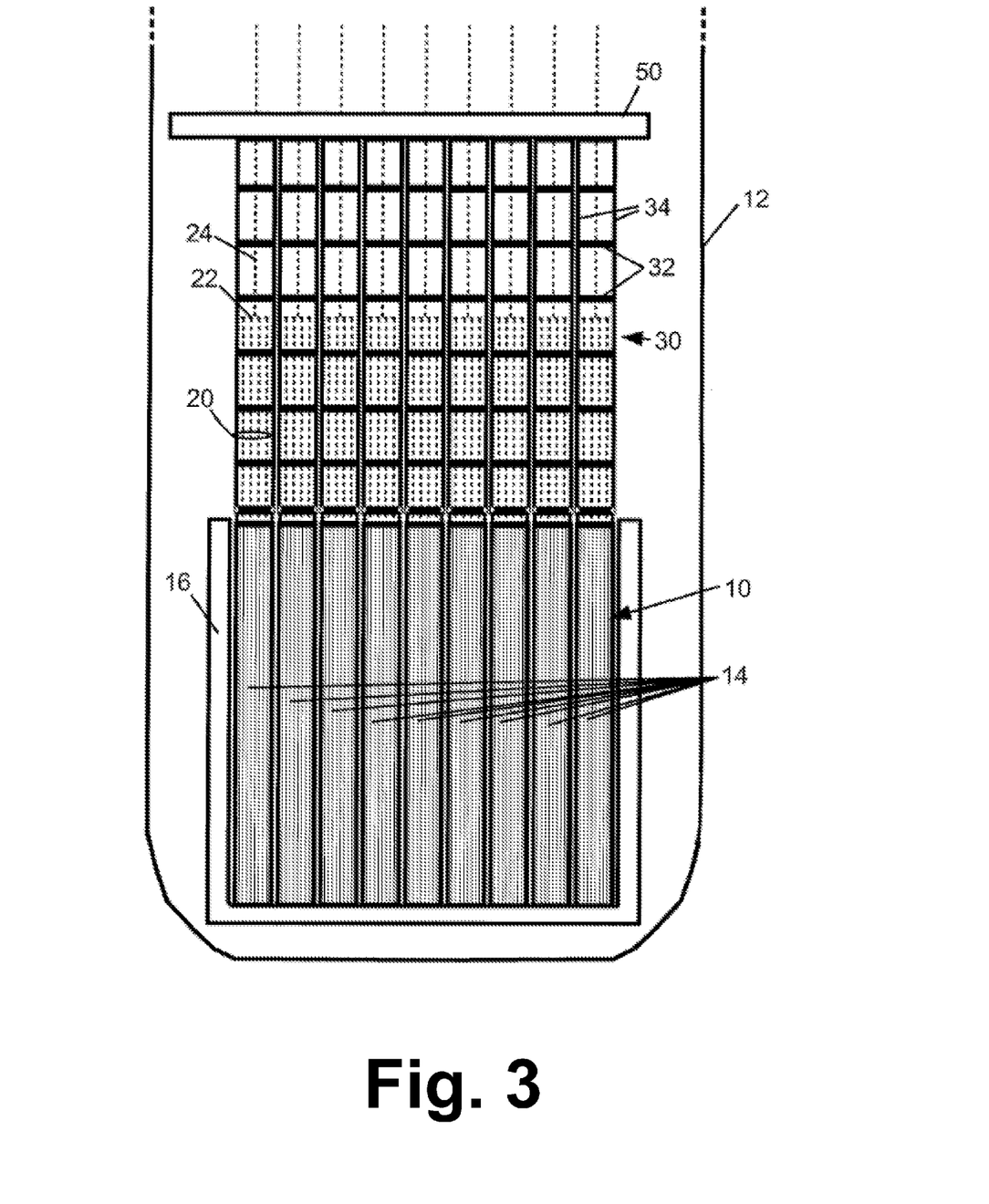
FIG. 3 diagrammatically shows a side sectional view of the lower portion of a low flow rate PWR as disclosed herein.
Figure 4:
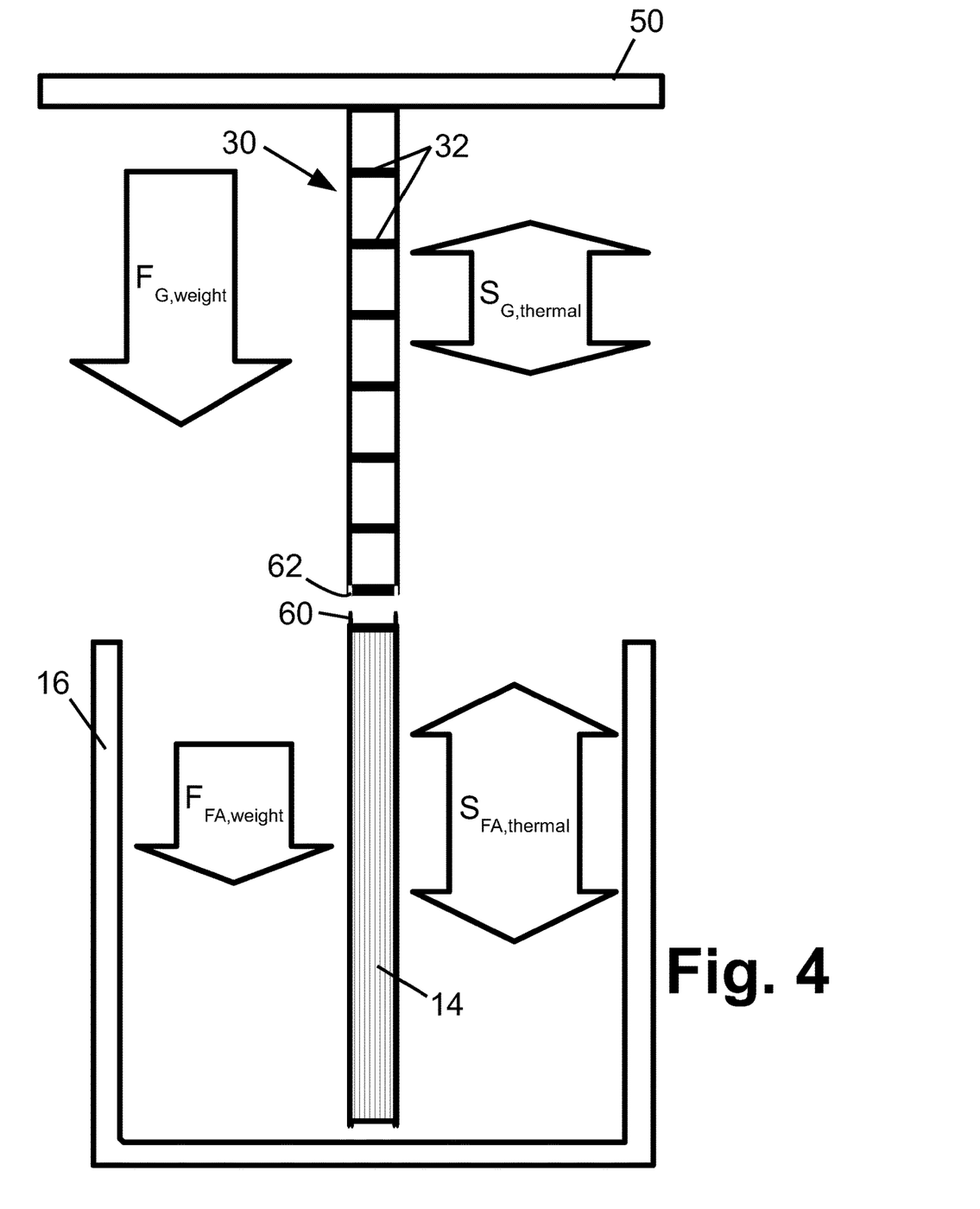
FIG. 4 diagrammatically shows an exploded view of a single fuel assembly and the corresponding CRA guide structure of the disclosed PWR of FIG. 3.

With reference to FIGS. 3 and 4, a pressurized water reactor (PWR) is shown which is designed to operate as a small modular reactor (SMR). The SMR preferably outputs 300 megawatts (electrical) or less, although it is contemplated for the SMR to output at higher power. The PWR of FIGS. 3 and 4 is designed to operate at a relatively low primary coolant flow rate, which is feasible because of the relatively low SMR output power. The PWR of FIGS. 3 and 4 includes a number of components that have counterparts in the PWR of FIGS. 1 and 2, including: a reactor pressure vessel 12; a reactor core 10 comprising fuel assemblies 14 in a core basket 16; a control rod assembly (CRA) for each fuel assembly that includes control rods 20 mounted on a spider 22 connected to the lower end of a connecting rod 24; and a CRA guide structure 30 for each CRA comprising horizontal guide plates 32 mounted in a spaced-apart fashion on vertical frame elements 34. Although these components have counterparts in the conventional PWR of FIGS. 1 and 2, it is to be understood that the sizing or other aspects of the components in the PWR of FIGS. 3 and 4 may be optimized for the SMR operational regime. For example, a PWR designed to operate at 150 megawatts electrical may have fuel assemblies 14 that are 8 feet long and use a 17×17 bundle of fuel rods per fuel assembly 14 with 24 guide tubes spaced on a 0.496-inch pitch.

The PWR of FIGS. 3 and 4 omits the upper core plate 40 of the embodiment of FIGS. 1 and 2. Omitting this weight-bearing plate 40 has substantial advantages. It reduces the total amount of material thus lowering manufacturing cost. Additionally, the upper core plate 40 presents substantial frontal area generating flow resistance. Although this can be mitigated to some extent by including flow passages in the plate 40, the frontal area occupied by the control rods 20, the lower end plates of the CRA guide assemblies 30, and the upper end fittings of the fuel assemblies 14, limits the amount of remaining frontal area that can be removed. The load-bearing nature of the upper core plate 40 also limits the amount of material that can be safely removed to introduce flow passages through the plate 40, since removing material to provide flow passages reduces the load-bearing capacity of the plate 40.

However, omitting the load-bearing upper core plate 40 introduces substantial new issues. In the embodiment of FIGS. 1 and 2, the plate 40 performs the functions of supporting the weight of the CRA guide assemblies 30 and providing the upper stop against which the lift force $F_{FA,lift}$ on the fuel assemblies 14 operates to stabilize the positions of the fuel assemblies 14. Moreover, the upper core plate 40 provides a common anchor point for aligning the fuel assemblies 14 with their respective CRA guide assemblies 30. These issues are addressed in the embodiment of FIGS. 3 and 4 as follows.

In the embodiment of FIGS. 3 and 4, the CRA guide assemblies 30 are suspended from above by a support element 50 disposed above the CRA guide assemblies 30. In embodiments in which the pressure vessel 12 is a cylindrical pressure vessel (where it is to be understood that "cylindrical" in this context allows for some deviation from a mathematically perfect cylinder, for example to allow for tapering of the upper end of the pressure vessel 12, adding various vessel penetrations or recesses, or so forth), the support element 50 is suitably a support plate 50 having a circular periphery supported by the cylindrical pressure vessel (for example supported by an annular ledge, or by welding the periphery of the plate 50 to an inner cylindrical wall of the cylindrical pressure vessel, or so forth). In some embodiments the CRA guide assemblies 30 are not supported from below. This arrangement is feasible because in the SMR design the reduced height of the fuel assemblies 14 reduces the requisite travel for the CRA and hence reduces the requisite height for the CRA guide assemblies 30 in the SMR of FIGS. 3 and 4 as compared with the higher power PWR of FIGS. 1 and 2.

The support element 50 is located in a less congested area of the pressure vessel 12 as compared with the upper core plate 40 of the PWR of FIGS. 1 and 2. The area above the CRA support structures 30 includes the upper ends of the CRA assemblies 30 and the connecting rods 24, but not the fuel assemblies. Accordingly, there is more "unused" frontal area of the support plate 50, which allows for forming relatively more and/or larger flow passages into the support element 50. The support element 50 is also further away from the reactor core 10 than the upper core plate 40 of the PWR of FIGS. 1 and 2, which makes any spatial variation in the flow resistance that may be introduced by the frontage of the support element 50 less problematic as compared with the upper core plate 40.

The load-bearing provided by the upper core plate 40 respective to the upward lift force $F_{FA,lift}$ is not needed in the SMR of FIGS. 3 and 4, because the flow rate sufficient to provide SMR output of 300 megawatts (electrical) is generally not sufficient to generate a lift force capable of overcoming the weight of the fuel assemblies 14. Thus, in the SMR embodiment of FIGS. 3 and 4 the fuel assemblies 14 have a net force $F_{FA,weight}$ which is the weight of the fuel assembly 14 minus the lifting force generated by the relatively low primary coolant flow rate. As a consequence, the fuel assemblies 14 remain supported from below by the core basket 16 (or by a core plate component inside of or forming the bottom of the core basket 16). Thus, in the embodiment of FIGS. 3 and 4 the upper end of the fuel assembly 14 is not configured as a load-bearing structure, and both the upper core plate 40 and the hold-down springs 42 are omitted in the SMR embodiment of FIGS. 3 and 4.

Figure 5:
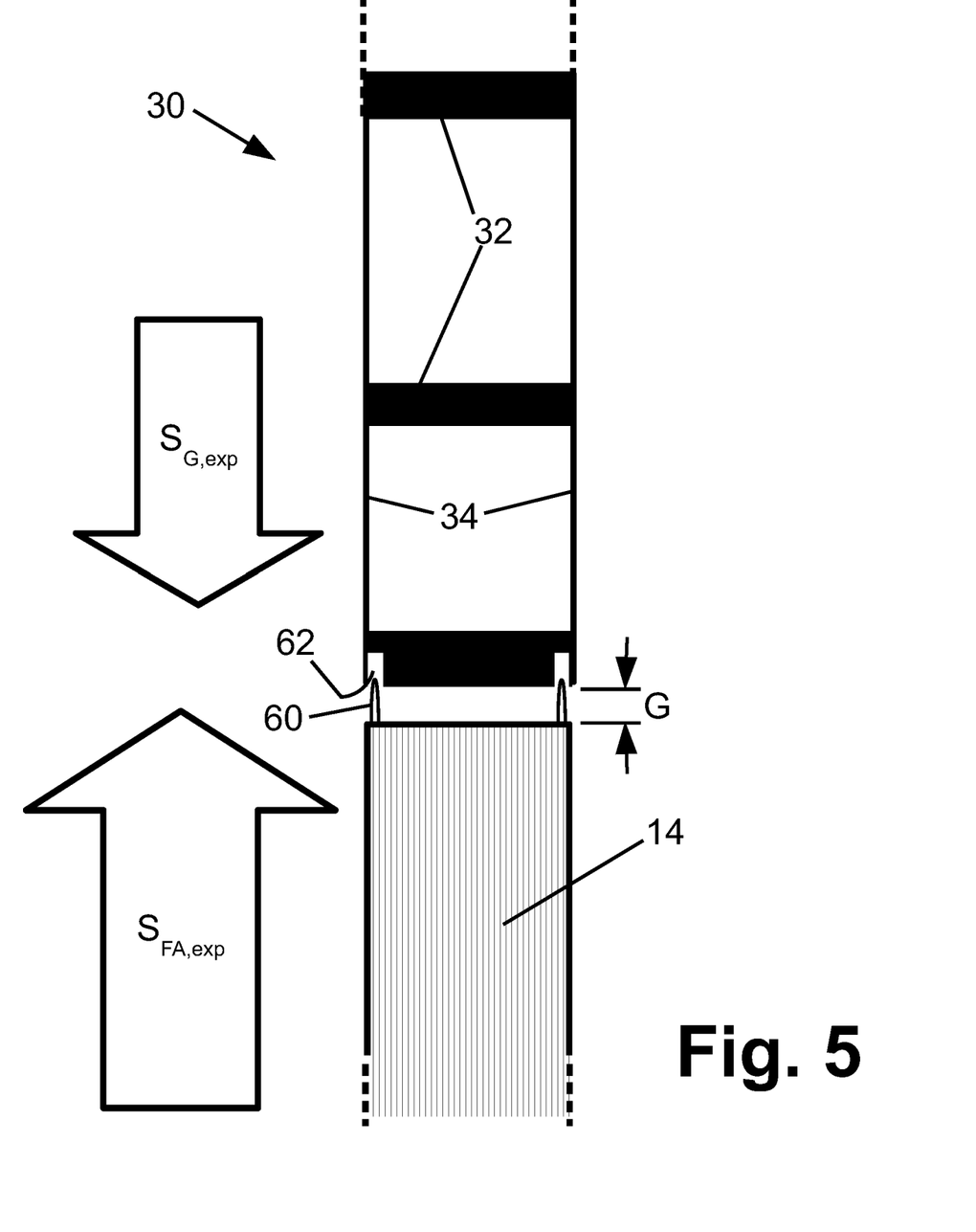
FIG. 5 diagrammatically shows an enlarged view of the lower end of the CRA guide structure and upper end of the fuel assembly of the embodiment of FIGS. 3 and 4 showing the mating features and the gap.

With continuing reference to FIGS. 3 and 4 and with further reference to FIG. 5, relative alignment between corresponding CRA guide structure 30 and fuel assembly 14 is achieved by engagement of mating features 60 on the top end of the fuel assembly 14 and corresponding mating features 62 on the bottom end of the CRA guide structure 30. The features 60, 62 ensure lateral alignment. In the illustrative embodiment the mating features 60 on the top of the fuel assembly 14 are protrusions, e.g. pins, and the mating features 62 on the bottom of the CRA guide structure 30 are mating recesses; however, other mating feature configurations are contemplated. In some embodiments the mating pins 60 on the top of the fuel assembly 14 also serve as anchor points for lifting the fuel assembly 14 out of the PWR during refueling or other maintenance operations, as described in Walton et al., "Nuclear Reactor Refueling Methods and Apparatuses", U.S. Ser. No. 13/213,389 filed Aug. 19, 2011, which is incorporated herein by reference in its entirety.

With particular reference to FIGS. 4 and 5, vertical alignment is an additional issue. The fuel assembly 14 and the CRA guide structure 30 are subject to respective strains $S_{G,thermal}$ and $S_{FA,thermal}$ as the components 14, 30 increase from ambient temperature to operational temperature. In the embodiment of FIGS. 3-5, the upper end of the CRA guide structure 30 and the lower end of the fuel assembly 14 are both anchored. Thus, the thermal expansion causes the upper end of the fuel assembly 14 and the lower end of the CRA guide structure 30 to come closer together. This is accommodated by a gap G between the lower end of the CRA guide structure 30 and the upper end of the corresponding fuel assembly 14. The gap G is chosen to accommodate thermal expansion at least up to temperatures credibly expected to be attained during operation or credible malfunction scenarios. The mating features 60, 62 are designed to span the gap G in order to provide the lateral alignment between the CRA guide structure 30 and corresponding fuel assembly 14. It will be noted that there is no spacer element or spring in the gap G. (The control rods 20 do pass through the gap G when inserted into the fuel assembly 14; however, the control rods 20 are not spacer elements that space apart the CRA guide structure 30 and fuel assembly 14, and are also not springs. Similarly, primary coolant water fills the gap G but is also neither a spacer element nor a spring).

The embodiment of FIGS. 3-5 employs the CRA guide structure 30 which comprises the spaced apart horizontal guide plates 32 mounted on the vertical frame elements 34. This is a conventional CRA guide structure design, and is commonly used in conjunction with external control rod drive mechanism (CRDM) units (not shown in FIGS. 3-5) disposed outside of and above the pressure vessel 12 of the PWR. In some embodiments, it is contemplated to employ internal CRDM disposed inside the pressure vessel 12.

Figure 6:
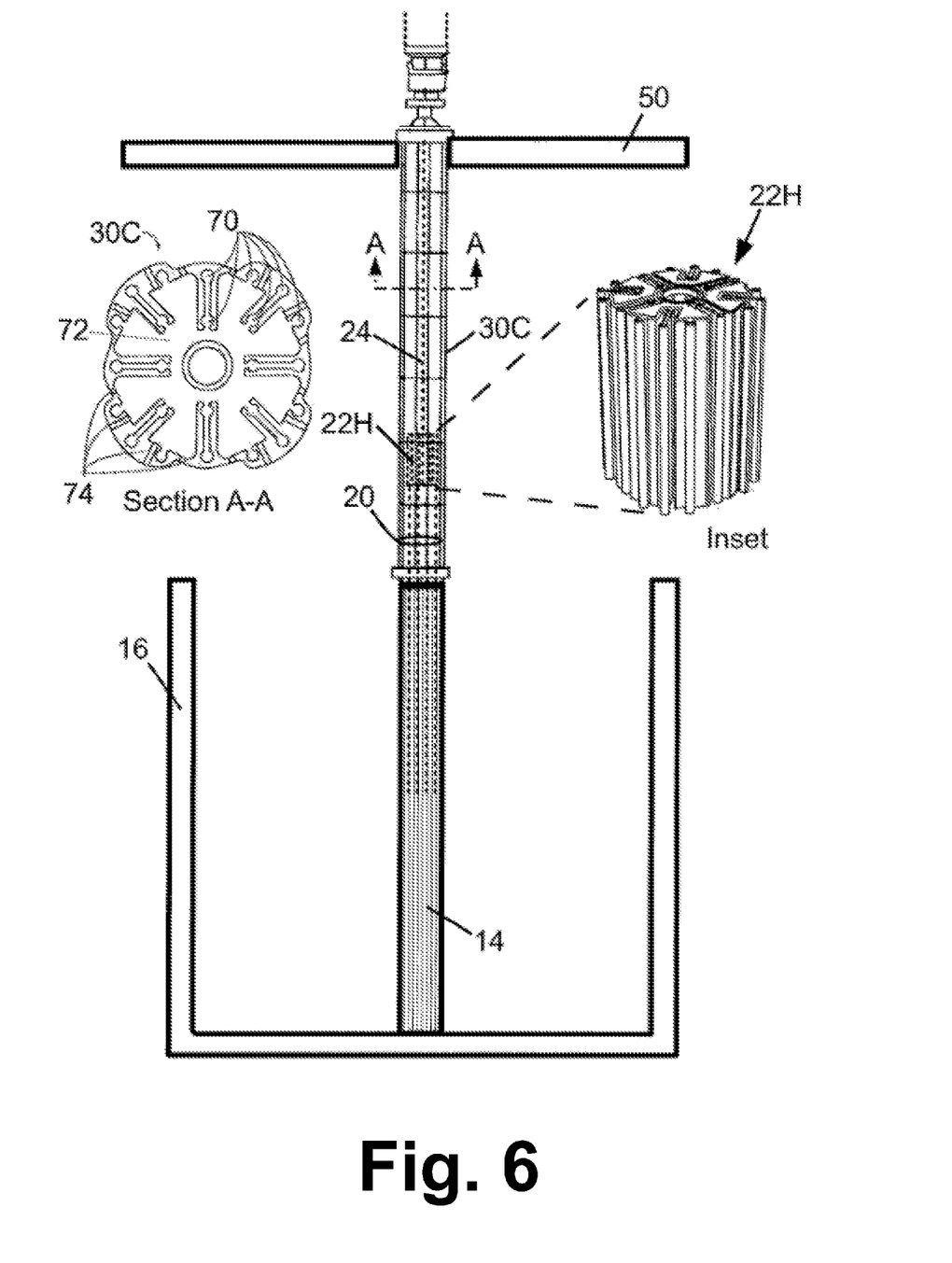
FIG. 6 diagrammatically shows a single fuel assembly and the corresponding CRA guide structure of another disclosed PWR embodiment.

With reference to FIG. 6, it is also contemplated to employ a continuous CRA guide structure 30C which provides continuous support/guidance of the CRA over the entire length of the continuous CRA guide structure 30C. The embodiment of FIG. 6 also employs a heavy terminating element 2211 in place of the conventional spider to provide the common termination structure at which the top ends of the control rods 20 are connected. The heavy terminating element 2211 advantageously adds substantial weight to the translating CRA 20, 2211, 24 as compared with the conventional CRA 20, 22, 24 of the PWR of FIGS. 3-5. This additional weight reduces SCRAM time and effectively compensates for the otherwise reduced weight of the SMR CRA which is shortened as compared with the CRA of a higher-power PWR. The "Inset" of FIG. 6 shows a perspective view of the heavy terminal element 2211, while "Section A-A" of FIG. 6 shows a cross-section of the continuous CRA guide structure 30C. As seen in Section A-A, the CRA guide structure 30C includes camming surfaces 70 that guide the control rods 20, and a larger contoured central opening 72 that guides the heavy terminal element 2211. Additionally, the CRA guide structure 30C includes flow passages 74 to allow primary coolant water to egress from the internal volume 70, 72 quickly as the CRA falls during a SCRAM. Additional aspects of the continuous CRA guide structure 30C and the heavy terminal element 2211 are set forth in Shargots et al., "Support Structure For A Control Rod Assembly Of A Nuclear Reactor", U.S. Ser. No. 12/909,252 filed Oct. 21, 2010, which is incorporated herein by reference in its entirety.

Figure 7:
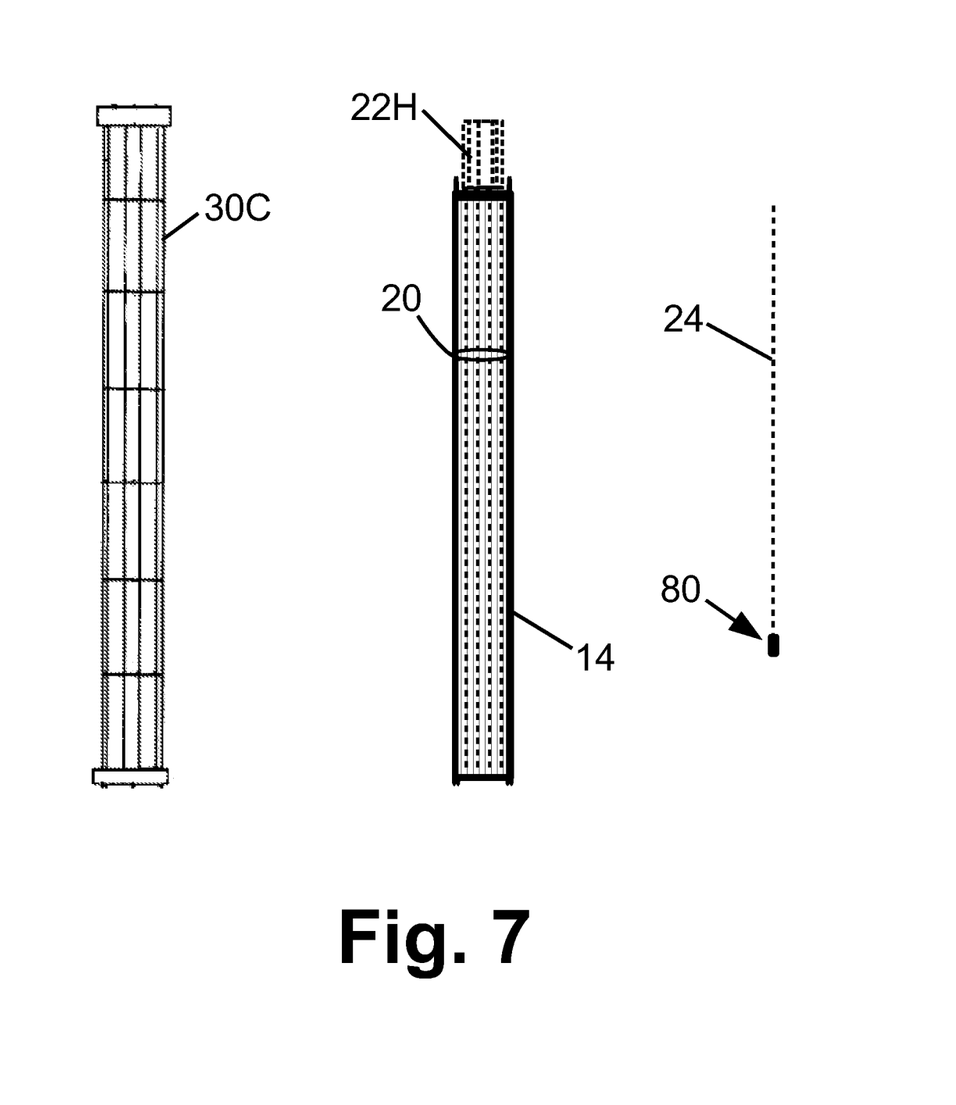
FIG. 7 diagrammatically shows a suitable shipping configuration for shipping the fuel assembly and continuous CRA guide structure via rail or another suitable carrier to a PWR site for installation during a fueling or refueling operation.

With reference to FIG. 7, the fuel assembly 14, CRA guide structure 30C, and connecting rod 24 are suitably shipped as components. Because the upper end of the nuclear reactor fuel assembly is not configured as a load-bearing structure and does not include the hold-down spring sub-assembly 42 (cf. FIG. 2), shipping weight is reduced, and the possibility of collision or entanglement of the hold-down springs with surrounding objects during shipping is eliminated. As seen in FIG. 7, the shipping configuration for the fuel assembly 14 includes the control rods 20 fully inserted into the fuel assembly 14. Optionally, the heavy terminal element 2211 (or, alternatively, the spider 22 in embodiments employing it) is connected to the top ends of the control rods 20 that are inserted into the fuel assembly 14 during shipping. The continuous CRA guide structure 30C can be shipped as a single pre-assembled unit, as shown in FIG. 7, or alternatively may be constructed as stacked segments that are shipped in pieces and welded together at the PWR site. The connecting rod 24 is suitably shipped as a separate element that is detached from the spider or heavy terminal element 22, 2211. The lower end of the connecting rod 24 optionally includes a J-lock fitting or other coupling 80 via which the lower end may be connected to the spider or heavy terminal element 22, 2211 during installation into the PWR. Alternatively, the lower end may be directly welded to the spider or heavy terminal element 22, 2211.

The preferred embodiments have been illustrated and described. Obviously, modifications and alterations will occur to others upon reading and understanding the preceding detailed description. It is intended that the invention be construed as including all such modifications and alterations insofar as they come within the scope of the appended claims or the equivalents thereof.

We claim:
1. A method comprising:
operating a pressurized water reactor (PWR) wherein the operating includes circulating primary coolant in a pressure vessel upward through a nuclear reactor core that includes a plurality of fuel assemblies and a plurality of control rod drive assembly guide structures suspended above the plurality of fuel assemblies, wherein each fuel assembly includes a plurality of fuel rods containing a fissile material;
during the operating, accommodating upward strain of the fuel assemblies and downward strain of the control rod drive assembly guide structures by a gap between the tops of the fuel assemblies and the bottoms of the suspended control rod drive assembly guide structures,
wherein the control rod drive assembly guide structures are suspended in the pressure vessel from a support member disposed above the control rod drive assembly guide structures.
2. The method of claim 1, further comprising:
during the operating, not applying a downward force other than gravity against the fuel assemblies.
3. A method of operating a pressurized water reactor including a pressure vessel having a plurality of fuel assemblies and a plurality of control rod guide assemblies suspended above the plurality of fuel assemblies, comprising the steps of:
operating the pressurized water reactor;
circulating primary coolant in the pressure vessel upward through the plurality of fuel assemblies;
during the operating, accommodating upward strain of the fuel assemblies and downward strain of the control rod drive assembly guide structures by a gap between the tops of the fuel assemblies and the bottoms of the control rod drive assembly guide structures,
wherein the control rod drive assembly guide structures disposed in the pressure vessel are suspended from a support element disposed above the control rod drive assembly guide structures.

4. The method of claim 3, further comprising:
during the operating, not applying a downward force other than gravity against the fuel assemblies.

\* \* \* \* \*

UNITED STATES PATENT AND TRADEMARK OFFICE
CERTIFICATE OF CORRECTION

Page 1 of 1

PATENT NO. : 11,120,919 B2
APPLICATION NO. : 15/974888
DATED : September 14, 2021
INVENTOR(S) : Lewis A. Walton et al.

It is certified that error appears in the above-identified patent and that said Letters Patent is hereby corrected as shown below:

In the Specification

In Column 1, Line 3, after the Title and before the first paragraph, please insert the heading --RELATED U.S. APPLICATION DATA--.

In Column 1, Line 9, after the first paragraph, please insert the following heading and paragraph:
--GOVERNMENT SUPPORT CLAUSE
This invention was made with government support under Contract No. DE-NE0000583 awarded by the Department of Energy. The government has certain rights in the invention.--.

In Column 7, Line 36, delete "2211" and insert --22H--.

In Column 7, Line 39, delete "2211" and insert --22H--.

In Column 7, Line 40, delete "2211," and insert --22H,--.

In Column 7, Line 46, delete "2211," and insert --22H,--.

In Column 7, Line 51, delete "2211." and insert --22H.--.

In Column 7, Line 56, delete "2211" and insert --22H--.

In Column 8, Line 5, delete "2211" and insert --22H--.

In Column 8, Line 14, delete "2211." and insert --22H.--.

In Column 8, Line 17, delete "2211" and insert --22H--.

In Column 8, Line 19, delete "2211." and insert --22H.--.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*